(12) United States Patent
Lualdi

(10) Patent No.: US 7,199,748 B2
(45) Date of Patent: Apr. 3, 2007

(54) POSITIONING SYSTEM FOR DATA AQUISITION

(75) Inventor: Maurizio Lualdi, Busto Arsizio (IT)

(73) Assignee: Politecnico di Milano, Milan (IT)

( * ) Notice: Subject to any disclaimer, the term of this patent is extended or adjusted under 35 U.S.C. 154(b) by 40 days.

(21) Appl. No.: 10/501,988

(22) PCT Filed: Jan. 17, 2003

(86) PCT No.: PCT/EP03/00520

§ 371 (c)(1),
(2), (4) Date: Jul. 21, 2004

(87) PCT Pub. No.: WO03/062860

PCT Pub. Date: Jul. 31, 2003

(65) Prior Publication Data

US 2005/0174295 A1    Aug. 11, 2005

(30) Foreign Application Priority Data

Jan. 22, 2002    (IT)    .......................... MI2002A0104

(51) Int. Cl.
*H01Q 3/00* (2006.01)
*G01S 13/00* (2006.01)
(52) U.S. Cl. ........................... 342/22; 342/27; 343/757
(58) Field of Classification Search .................. 342/22; 343/757
See application file for complete search history.

(56) References Cited

U.S. PATENT DOCUMENTS

| 3,752,558 | A | * | 8/1973 | Lloyd .......................... 359/198 |
| 4,544,892 | A | * | 10/1985 | Kaufman et al. ........... 324/334 |
| 4,908,717 | A | * | 3/1990 | Natori ......................... 358/474 |
| 5,634,378 | A | | 6/1997 | Burkhardt, Jr. et al. |
| 6,084,412 | A | | 7/2000 | Guo et al. |
| 6,091,354 | A | | 7/2000 | Beckner et al. |
| 6,094,157 | A | | 7/2000 | Cowdrick |
| 6,518,913 | B1 | * | 2/2003 | Satzler ......................... 342/22 |
| 6,600,320 | B2 | * | 7/2003 | Guo et al. ................... 324/336 |
| 6,771,399 | B1 | * | 8/2004 | Batten ......................... 358/497 |
| 6,949,930 | B2 | * | 9/2005 | Hansen et al. .............. 324/329 |

* cited by examiner

*Primary Examiner*—Thomas H. Tarcza
*Assistant Examiner*—Matthew M. Barker
(74) *Attorney, Agent, or Firm*—Wenderoth, Lind & Ponack, L.L.P.

(57) ABSTRACT

The present invention refers to a positioning system, in particular for carrying out Georadar acquisitions, and more in particular of a 3-dimension type. In one embodiment, the positioning system for data acquisition using a data acquisition system includes at least one antenna that is passed over a surface to be surveyed. The positioning system includes a plurality of guides side by side that can be coupled to the surface and a structure having a surface with at least one guide that engages the plurality of guides and which is suitable for being conducted along the plurality of guides. The structure includes the at least one antenna of the data acquisition system (FIG. 1).

18 Claims, 1 Drawing Sheet

POSITIONING SYSTEM FOR DATA AQUISITION

BACKGROUND OF THE INVENTION

The present invention refers to a positioning system, in particular for acquiring Georadar type data, and more particularly of the 3-dimension type.

The laying of new technological networks (optical fibers) and the new lines for conveying electricity is based on no-dig or trenchless technologies. This technology is characterized by the possibility of laying the plants without having to dig a trench. A remote-control drill drags the cable along a preset path. The intensive laying of cables and tubes in the first meters underground and the lack of maps of the technological plants quite often make surveys necessary prior to the laying phases.

The Georadar surveys are up to now the only ones capable of identifying any technological plant or construction present underground.

During the laying of a cable without digging a trench, the more dangerous portions of the trench are the drill immersion and surfacing areas, that have a plan extension of about 4 m*4 m for a depth of a few meters, where the majority of the subservices can be found. The drill is immersed to the preset depth and then advances horizontally parallel to the plane (surface) of the ground.

In addition, this laying technique is suggested for laying the new technological networks (Directive dated 3 Mar. 1999 art.5).

The geophysical radar or Georadar uses the reflection of electromagnetic waves for exploring underground. The technique is based on the insertion in the ground, by means of a transmitting antenna, of electromagnetic waves with extremely brief impulses (a few nanoseconds), whose central frequency is between 10 and 2000 MHz. The signal reflected from the surfaces of any discontinuity present underground is received by a receiving antenna and recorded after sampling at suitable frequency. This type of survey enables high resolution measurements to be carried out with graphic return of an underground continual section (time-distance) in real time To analyse an area of ground, the transmission and reception antennas have to be passed over the entire area concerned. The depth to be surveyed and the resolution required are determined through the choice of the antenna. High frequency antennas have good resolution but low penetration. To conduct Georadar surveys to locate the subservices the resolution needed is a few centimeters and the survey depth required is a few meters. Antennas with a frequency of the central band around 400 MHz are generally used.

The processing of the data received can be made by means of a bidimensional analysis, supplying in output the data relating to the various vertical planes analyzed. It can also be made by means of a three-dimension analysis. For three-dimension analyses the data received have to meet the theorem of the spatial sampling. In addition, good contact has to be kept and therefore good coupling between the ground and the antenna, as if there is air between the antenna and the ground the quality of the data deteriorates because of the reduced penetration of the signals.

Normally, for acquiring data, the lines that will indicate the path that the antennas will have to follow are traced on the portion of ground to be analyzed, by means of paint or chalk, or theodolites are used.

In addition, the majority of times, the Georadar surveys have to be carried out in heavily urbanized areas where it is very difficult to interrupt the traffic of vehicles, pedestrians or commercial activities. Therefore, they are operations that have to be carried out quickly minimizing as much as possible the disturbance to the road traffic and the surface activities.

SUMMARY OF THE INVENTION

In view of the state of the technique described, an object of the present invention is to provide a positioning system, in particular for achieving Georadar acquisitions that is simple to carry out and apply, has low cost, and enables data acquisition to be carried out rapidly and with precision.

In accordance with the present invention, this and other objects are achieved by a positioning system for acquiring data using a data acquisition system including at least one antenna that is passed over a surface to be surveyed. The positioning system includes a plurality of guides side by side, that can be coupled to the surface; and a structure having a surface with at least one guide that engages the plurality of guides and is suitable for being conducted along the plurality of guides. The structure includes the at least one antenna of the data acquisition system.

Thanks to the present invention, the most precise low cost data acquisition possible can be carried out. In addition, it can be carried out in limited space and on irregular surfaces because of its innate flexibility. It is simple, reliable, has a very limited weight and is extremely easy to apply. It guarantees very good coupling between the antenna and the means surveyed because the antenna can follow any possible sinking.

In addition, the system presented herein can be applied and can be adapted to any Georadar acquisition system.

It can be used without interrupting the traffic of vehicles or pedestrians as its dimensions are small and it does not move even if a vehicle passes over it.

BRIEF DESCRIPTION OF THE DRAWINGS

The characteristics and advantages of the present invention will appear evident from the following detailed description of an embodiment thereof, illustrated as non-limiting example in the enclosed drawings, in which.

DETAILED DESCRIPTION OF THE INVENTION

The inventive idea of the present invention is based on arranging some guides on the surface to be surveyed to use as tracks for the movements of the Georadar antenna on the ground.

Figure 1:
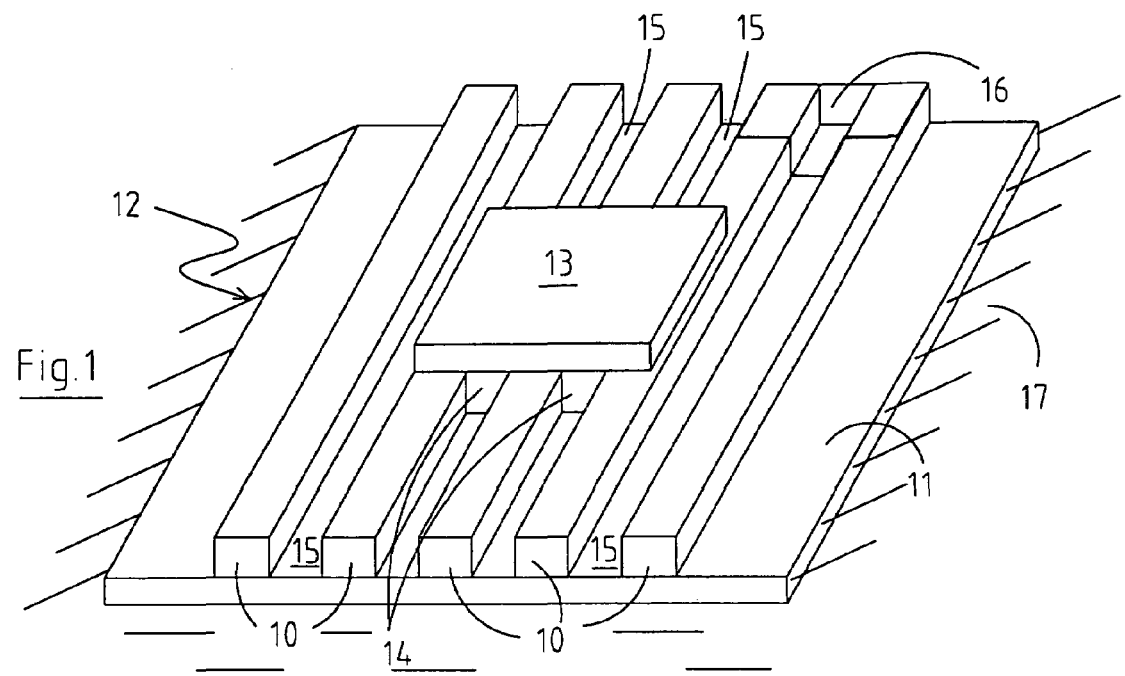
FIG. 1 represents a positioning system for carrying out Georadar acquisitions in accordance with the present invention, seen in axonometry.
Figure 2:
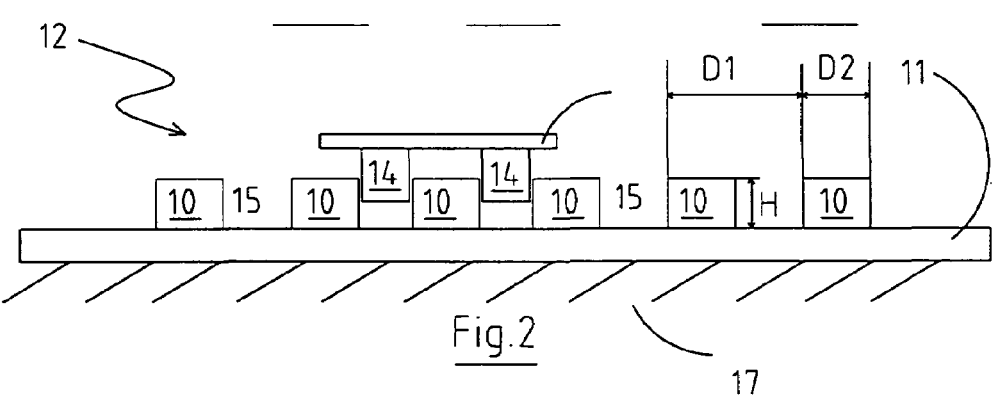
FIG. 2 represents a positioning system for carrying out Georadar acquisitions in accordance with the present invention, seen in profile.

In FIG. 1 which is an axonometric view and in FIG. 2 which is a profile view of the positioning system for carrying out Georadar acquisitions in accordance with the present invention, base guides 10 are shown positioned on a supporting layer 11, all in the form of a mat 12 placed on top of a surface to be surveyed 17.

A support structure 13 for supporting the antenna Georadar (not shown) is placed on the mat 12. This support structure 13 has some support guides 14 provided on its lower surface, preferably at least two, that engage the recesses 15 left by the base guides 10 on the supporting layer 11. Only one support guide can be enough if it is capable of ensuring alignment with the base guides 10. The base guides 10 are preferably positioned on the supporting layer 11 equally spaced out and parallel.

The support structure 13, in particular its upper part, can be made in any manner to support and hold the transmission and reception system (not shown in the Figure) placed over it while the support structure 13 is being pulled. In the alternative, the support structure 13 can support even only one or more antennas connected to the system by means of suitable cables.

Once the Georadar antenna has been positioned over the support structure 13 itself, it is pulled with the support structure 13, either manually or mechanically, along the base guides 10 to guarantee the area to be investigated is covered. Preferably, making unidirectional, parallel and progressive profiles. For example, starting from one corner of the mat 12 and running along the entire length of the guide. At the end of the base guide, the support structure 13 is moved with the antenna to the adjacent base guide, and the support structure 13 is passed along the new base guide. Adjacent base guides can be passed over in the same direction or in opposite directions.

The mat 12, with the base guides 10, is preferably composed of a soft material, so that it can follow the unevenness of the ground, such as rubber, PVC, cardboard, etc.

In an embodiment of the present invention, with a working frequency of 500 MHZ, (one antenna with the dimensions of about 60×30×21 cm.), a mat 12 with the dimensions of about 4×4 m having a height of about 0.3 mm, the distance D1 between two guides is about 5 cm, the height H of the guide is about 0.3 mm, the distance D2 of the guide is about 2.45 cm. The measurements of the guides 14 are the same as the guides 10 so that they can easily engage with each other. In this embodiment, the support guides 14, 2.45 cm wide, engage the recesses 15 with a width of 2.55 mm. Thus a clearance of 1 mm has been created between the support guides 14 and the recesses 15 so that the support structure 13 can be easily pulled. According to the materials and the tolerances required, the dimensions given above can vary according to specific needs.

Normally different working frequencies are used in accordance with the resolution and depth required for the surveys. For example, frequencies commonly used are 125, 250, 500, 1000 MHz.

With the aim of limiting the number of mats 12 to the variation of the frequency, the mat 12 can have the base guides 10 with a close pitch and dimensions such that they meet the sampling theorem for a higher frequency antenna. For acquisitions with a lower frequency antenna, the same mat is used but the number of parallel profiles to be carried out is reduced passing along profiles spaced out between each other according to multiples of the minimum distance that exists between two parallel guides. To reduce the passage errors between one passage of the antenna and the other, the guides have been fitted with an identification (for example, with suitable colors) so as to indicate the different steps for the different frequencies, or with suitable reference symbols.

The measurements of the guides are determined for the highest use frequency (lowest wavelength) and the base guides 10 are highlighted so that the structure 13 will have to use as a reference for the lower frequencies, for example, a color or a symbol for each frequency that can be utilized.

Preferably, to align the sections made by pulling the support structure 13 and in particular to facilitate the departure or the arrival (or both) of the passage along the guides, the guides themselves have been provided with a stopping device 16 (only partly shown for simplicity, but which can be extended for all the base guides 10 and the corresponding recesses 15). This permits precise reference points to be achieved for the beginning and the end of the data acquisition. Alternatively, a profile can be used as the stopping device 16. For example, a profile can be applied to the extremity of the guides, such as a mechanical stop or any other retainer.

The supporting layer 11 (as well as the guides 10 and 14) preferably has a smooth upper surface so that the support structure 13 can advance without problems, and has a lower abrasive or rough surface so that once the mat 12 has been placed on the ground it has no movement. As an alternative or in combination, the lower surface of the mat 12 can be provided with glue for greater adherence.

In addition, the base guides 10 can also be directly fixed to the ground (for example with glue) with manual or mechanical systems without the presence or the need for the supporting layer 11.

Other variations to the above arrangement are possible for the adjustment to the specific working conditions and considering the different needs that can arise, such as when the surface surveyed is not horizontal ground but a vertical wall.

Figure 3:
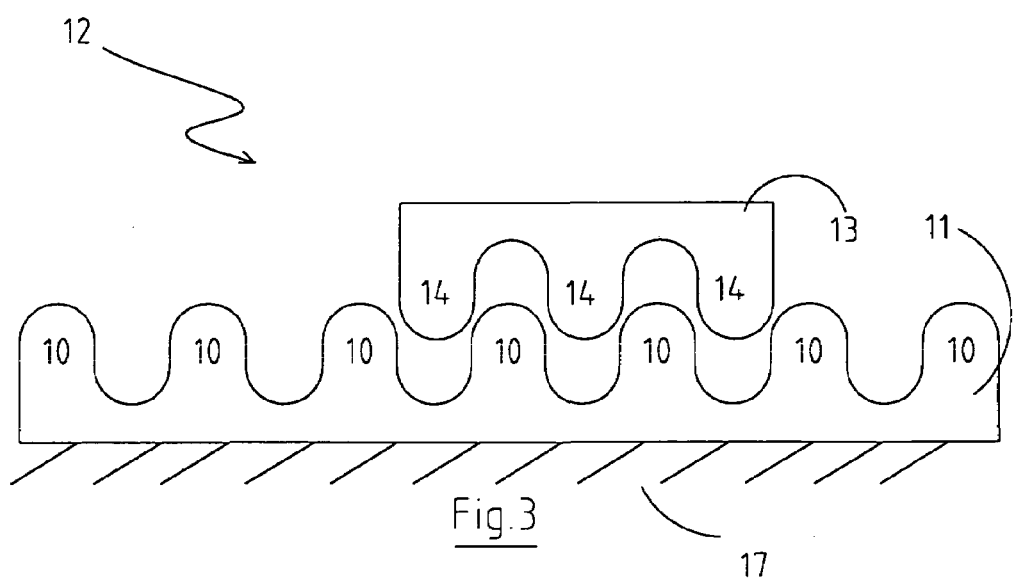
FIG. 3 represents a variant of a positioning system for carrying out Georadar acquisitions in accordance with the present invention, seen in profile.

FIG. 3 represents a variant of the system in accordance with the present invention, seen in profile. The guides 10 and 14 have been described previously as having a substantially rectangular shape, but they can also be shaped differently, for example triangular, trapezoidal or with a sinusoidal form. Advantageously, a sinusoidal form is that of the corrugated type of cardboard, normally used for packaging. Thus a mat 12 can be created with a piece of corrugated cardboard, with the dimensions desired. As the support structure 13, another piece can be used, with the dimensions desired, to apply suitable directly or indirectly to the Georadar antenna. Alternatively, a structure in a plastic material (more resistant) with the same shape as the cardboard.

The present invention developed for Georadar acquisitions can naturally also be used for all those applications in which a structure has to follow particular references suitably spaced out, such as a scanner, sounding, ultrasonic surveys, and other non-destructive surveys.

The positioning system in accordance with the present invention guarantees the supply of data that enables a success rate of 98% to be reached during the calculation phase in determining the positioning of structures within the surveyed area.

The acquisition time is also reduced considerably (up to ⅕–⅙ in relation to the systems normally used), as the preparation of the area surveyed no longer has to be prepared for the following survey.

The invention claimed is:

1. A positioning system for use in a data acquisition system having at least one antenna to be passed over a surface to be surveyed, said positioning system comprising:
   a plurality of base guides arranged side-by-side to one another, said base guides operable to be coupled to the surface; and a support structure for supporting the at least one antenna, said support structure including at least one support guide for engaging at least one of said base guides, said at least one support guide being oriented to direct said support structure along said at least one of said base guides;

wherein said base guides are parallel to each other, and each of said at least one support guide of said support structure is fitted within a respective recess defined between an adjacent pair of said base guides, each of said at least one support guide being oriented so as to be parallel to said adjacent base guides.

2. The positioning system of claim 1, wherein said plurality of base guides are linear base guides.

3. The positioning system of claim 1, wherein said plurality of base guides are positioned on a supporting layer made of flexible material.

4. The positioning system of claim 3, wherein said supporting layer, said plurality of base guides, and said at least one support guide are arranged to define an upper surface on which said support structure travels.

5. The positioning system of claim 3, wherein said supporting layer has a lower abrasive surface to prevent movement after said supporting layer has been positioned.

6. The positioning system of claim 1, wherein said plurality of base guides are spaced apart from each other at a preset distance.

7. The positioning system of claim 1, wherein said plurality of base guides are spaced apart from each other proportional to a working wavelength of a measuring system placed above said support structure.

8. The positioning system of claim 1, wherein said plurality of base guides comprise at least one group of said base guides identified with an identification element.

9. The positioning system of claim 1, wherein said positioning system is operable to permit three-dimensional Georadar acquisitions.

10. The positioning system of claim 1, further comprising a stopping device for stopping a movement of said support structure, said stopping device being located at at least one end of at least one of said plurality of base guides.

11. The positioning system of claim 1, wherein each of said plurality of base guides is made of flexible material.

12. The positioning system of claim 1, wherein said plurality of base guides are directly applied to the surface by glue.

13. The positioning system of claim 1, wherein said plurality of base guides are composed of a layer of corrugated cardboard.

14. The positioning system of claim 13, wherein said at least one support guide is composed of a layer of corrugated cardboard fixed to a lower surface of said support structure.

15. The positioning system of claim 1, further comprising a flexible supporting layer, said base guides being fixed to said supporting layer so as to be parallel to each other and such that an upper surface of said supporting layer and side walls of an adjacent pair of said base guides define a recess formed between said adjacent pair of said base guides, said at least one support guide being fitted into said recess.

16. A data acquisition system comprising:
at least one antenna to be passed over a surface to be surveyed;
a positioning system including:
a plurality of base guides arranged side-by-side to one another, said base guides operable to be coupled to the surface; and
a support structure supporting said at least one antenna, said support structure including at least one support guide for engaging at least one of said base guides, said at least one support guide being oriented to direct said support structure along said at least one of said base guides;
wherein said base guides are parallel to each other, and each of said at least one support guide of said support structure is fitted within a respective recess defined between an adjacent pair of said base guides, each of said at least one support guide being oriented so as to be parallel to said adjacent base guides.

17. The data acquisition system of claim 16, further comprising a transmitter and a receiver for allowing said at least one antenna to transmit and receive signals.

18. The data acquisition system of claim 16, wherein said positioning system further includes a flexible supporting layer, said base guides being fixed to said supporting layer so as to be parallel to each other and such that an upper surface of said supporting layer and side walls of an adjacent pair of said base guides define a recess formed between said adjacent pair of said base guides, said at least one support guide being fitted into said recess.

* * * * *